March 9, 1965 E. A. MARKS ETAL 3,173,120
POTENTIOMETRIC TRANSDUCER
Filed Feb. 18, 1964 4 Sheets-Sheet 1

INVENTORS
EUGENE A. MARKS,
JOHN A. BENTSEN
WERNER R. HOFMANN
BY

3,173,120
POTENTIOMETRIC TRANSDUCER
Eugene A. Marks, Riverside, John A. Bentsen, Palm Springs, and Werner R. Hofmann, Bloomington, Calif., assignors to Bourns, Inc.
Filed Feb. 18, 1964, Ser. No. 349,786
21 Claims. (Cl. 338—36)

The invention hereinafter disclosed pertains to measuring instruments and more particularly to potentiometric transducers such as potentiometric pressure or force transducers. The invention presents and comprises, among other features, improvements in such instruments whereby the range of the physical variable being measured by an instrument of a given configuration may be greatly increased with concurrent reduction of the total error of the instrument.

Each instrument used for measuring force or pressure has invariably associated with it a number of errors, the nature of which are well understood by those skilled in the art. Those errors, including nonlinearity, hysteresis, friction, non-repeatability, and temperature-variation sensitivity, are quite commonly given individual maximum permissible values in defining instrument performance or specifications. However, the actual performance of the instrument depends upon how the various individual errors combine in a particular defined set of environmental conditions or extremes. Accordingly there has been established in the art the concept of an "error band" graphically defined or delimited at its ends by the lower and upper extremes of the range of operation of the instrument of concern, and defined or delimited between its ends by an upper boundary below which all measurement-indications of the instrument fall and by a lower boundary above which all the measurement-indications of the instrument fall, and between which bounds may be a linear continuous series of ideal measurement-indications (ideally a straight line in most cases) which represent the output indications of an ideal error-free instrument over the complete range of operation of the instrument.

For an extended elucidation of the error-band concept, reference may be had to prior-art publications including "Proceedings of the May 1960 National Aerospace Symposium, Instrument Society of America Division" (held at San Diego Calif.); and "Guide for Nomenclature and Specification Terminology for Aerospace Test Transducers With Electrical Output," I.S.A.R.P.—37.1, pages 9 and 12 (April 1963), published by the Instrument Society of America. As indicated in the noted prior art literature, error bands may be of several classes or types, e.g., "Static Error Band" (definitive of the maximum deviation, in percent of full output range, from a straight line drawn through the coordinate of 0% range, 0% output, and 100% range, 100% output), "Dynamic Error Band" (identical to the static error band but produced while the instrument is subjected to mild vibration so as to substantially eliminate any effects of friction); "Static Temperature Error Band" (the same as static error band but with the introduction of errors associated with specified temperature extremes); etc. As herein used, the term "error band" of an instrument is defined as the band of allowable deviations of output values from a specified reference line or curve representing an ideal series of output values, the deviations being attributable to the instrument or transducer and as measured over two consecutive calibration cycles.

It is known that in prior art instruments attempts were made to minimize the effects of friction incident to pivotally mounted levers, by utilizing as pivot means a set of crossed leaf-springs, and to minimize adverse effects of intense vibration or acceleration by counterbalancing pivoted members. A typical example is illustrated in the transducer disclosed in U.S. Patent No. 2,931,994, issued April 5, 1960, in which instrument an elastic pressure-sensitive cell expands and contracts in response to changes in the pressure differential exhibited between the interior and exterior of the cell, the incident movements of an unanchored portion of the cell being transmitted by a force arm or transmitter to a counterbalanced lever pivotally supported by a set of crossed leaf springs, the lever serving to amplify the extent of movement and to effect movement of a potentiometer wiper contact along a potentiometer resistance element whereby the change of potential exhibited between the wiper contact terminal and a terminal of the resistance element represents a measure of the change in the pressure differential sensed by the cell. With such prior art potentiometer instruments, small forces or low-pressure differentials are measured over a certain range thereof that is governed by the cell dimensions, the relatively low spring constant of the cell, the length of the electrically effective portion of the resistance element, and the multiplication ratio of the lever arm used to move the wiper contact, as is evident from examination of, for example, FIG. 1 of the above-mentioned patent. In such instruments, measurement of large forces or higher pressures is accommodated by using stiffer cells, the range over which the instrument is operable being limited by the permissible extent of movement of the free or driving portion of the cell or elastic sensor, and the length of the resistance element. It is evident that if the cell 18 depicted in the cited patent were of thin material and of low spring constant to permit the instrument to satisfactorily measure pressure differentials over a range of low pressures (for example, over the range from 0 to 10 p.s.i.), the cell would be such as to compress and move the wiper contact to the upper end of the resistance element 34 under a pressure differential of 10 p.s.i., and to expand and move the contact to the lower end of the resistance element when subjected to zero pressure differential. In such an instrument the hysteresis error introduced by the cell is of low order and the total error of the instrument would be principally dependent upon friction in the connection of the force bar and lever, the friction incident to the wiping of the contact on the resistance element, and friction in the pivot; that is, friction error is predominant. If the instrument were designed for measurement over a range of high pressures (for example, over the range from 400 p.s.i. to 500 p.s.i.), the cell would be very stiff with a high spring constant, and hysteresis error would grossly predominate over friction error, since the friction forces involved would be insignificant relative to the force available and used to move the force rod and wiper contact. Since the extents of movement of the force rod 36 in the two exemplary situations noted would ordinarily be quite different, being extensive for the low-pressure instrument and only small in the case of the high pressure instrument, two quite different design configurations would be used for the two instruments. For example, in the high-pressure instrument the small range of movement of the cell or sensor would require extensive multiplication by the lever if full range of movement of the wiper contact (necessary for desired maximum resolution) were to be attained.

Similarly, if it were required that the instrument have an operating range of 0 to 500 p.s.i., a still different design would be required with different dimensions and placement of parts. In such an instrument the hysteresis error would grossly predominate when operating in the high pressure end or portion of the range of the instrument, with friction error becoming relatively important and predominant when operating near the low pressure end of the range.

It is evident that with resolution, total resistance, and eletrical characteristics of the potentiometer resistance element (34 in the transducer of the cited patent) specified and fixed, the effective length of the element is fixed. Thus, with the amplification ratio of the lever and force arm mechanism selected, the range of motion of the sensor or cell is determined. It is also evident that the size of the sensor will vary considerably according to the pressure or force range, and the maximum pressure or force, to be accommodated by the instrument. Grossly large sensor dimensions necessary for low pressures would necessiate larger instrument cases; and change of movement-amplification to permit use of a smaller sensor as a compromise is resorted to, with incident change of design and placement of the lever system. Thus it is seen that in order to provide efficient and economical instruments for the several types of force or pressure ranges that it is desirable to accommodate, it is necessary in the prior art instruments to have a plurality of sizes and designs of instrument housings. This prior art requirement, and the mode and means for overcoming that undesirable feature of the prior art, are more fully expained hereinafter in the body of this specification.

In general, the present invention provides a method and means whereby a potentiometer type of force or pressure transducer may, within a single size and design configuration and with only simple and minor changes, be made to provide eminently satisfactory force or pressure measurements over any of a wide variety of force or pressure ranges, with concurrent improvements in static and dynamic error bands (providing much flatter error band characteristics), and thus effect great economies by eliminating necessity for producing various dimensionally-different structures for accommodation of various different ranges of force or pressure. These meritorious and novel improvements the invention accomplishes in part by providing means whereby resistance element wiper travel may be the same for all ranges of force or pressure and whereby the degree or extent of sensor movement may be very accurately and selectively multiplied or amplified to the exact degree required to utilize the full effective constant length of resistance element and wiper travel for each of the ranges, all with improved accuracy and freedom from environmental troubles, and thus permitting instruments for a wide variety of ranges of measurement to be substantially alike in dimensions of principal parts and varying only in selectively variable respects and to thus effect great savings in the manufacture of instruments of the noted class. Other improvements, in reduction of error by reduction of friction, increased stability and accurate operation of components, and reduction in size of mechanisms, are also provided. The ability to use any sensor of a group of dimensionally similar sensors of widely differing characteristics (suited to sensing over differing ranges of force or pressure) and hence of widely differing maximum sensor travels, while using a standard housing, resistance element, lever, support means, etc., in all instruments irrespective of the range to be accommodated, is principally gained by novel means whereby the ratio of multiplication of the sensor travel is selected as required, without, however, adversely affecting in any way the accuracy of the instrument or its mechanisms. The mentioned economies are attained by making substantially all the components of the instruments standard and identical for all ranges, with the exception of the sensor elements which necessarily must differ to properly respond to respective different ranges of force or pressure; whereby design, production, and assembly of several families of somewhat similar but nevertheless differing parts is obviated. A housing having a chamber adequate for reception and mounting of any of the several sensors is provided, and in the housing an adjustable support means for the other movable components of the instrument is provided, the construction and arrangement being such that an elongate transmitter element axially movable in unison with the free portion of the sensor is connected to a pivoted multiplier lever at a selected point along the lever and at a point on the axis of the sensor and transmitter. The distance of that point from the fulcrum of the lever is adjusted by moving the lever fulcrum or pivot axis toward or away from the transmitter as required. Since the lever fulcrum and the potentiometer parts are mounted in proper relative positions on the support means, simple adjustment of the support means transversely of the axis of the transmitter suffices for attaining any desired ratio of multiplication of movement of the sensor-transmitter, while leaving the motion of the transmitter substantially precisely axial and perpendicular to the plane of the free portion of the sensor. Thus if a stiff sensor is used, as for measuring large forces or high pressures, the relatively small maximum sensor movement is subjected to a high ratio or degree of amplification by moving the fulcrum axis of the lever to a location quite close to the transmitter, the support means being adjusted to so move the fulcrum or lever pivot. Conversely, if a "light" sensor is used, giving a relatively large maximum movement of the free portion of the sensor and transmitter, the support means is moved to position the pivot axis or fulcrum more distant from the transmitter so a much lower amplification of transmitter movement is effected. Thus for any range of movement of the sensor and transmitter, a suitable motion amplification ratio is selected by adjustment of the support means, whereby the full sweep or range of the potentiometer wiper on the resistance element is attained and utilized irrespective of the type of sensor employed.

Further according to the invention, improvements in modes and means of attaching the transmitter to the lever so as to produce linear translation of the reciprocatory axial motion of the transmitter to rocking pivotal motion of the wiper arm or lever, are attained. Also, improvements in the potentiometer wiper and contact are provided whereby friction effects and contact variation under vibration are minimized. Additionally, a novel type of pivot for the wiper arm lever is provided, using commercially available crossed leaf-spring pivot means in a manner and construction whereby nonlinearity of motion-translation is greatly reduced and whereby adverse effects of vibration or acceleration of the instrument are markedly reduced and whereby the usual free-wire electrical lead to the potentiometer wiper is eliminated, all contributing to much improved performance of the instrument in practical use. The several means for effecting these additional improvements are fully explained in the body of this disclosure.

The preceding brief general description of principal features and aspects of the invention makes it evident that it is a principal object of the invention to provide improvements in transducer instruments of the types mentioned or discussed.

Another object of the invention is to provide means whereby widely differing ranges of forces or pressures may be measured with apparatus by simple substitution a different sensor for a respective range, and by simple adjustment of adjustable means, whereby necessity for designing and manufacturing different sizes of transducers for different ranges is obviated.

Another object of the invention is to provide a force or pressure transducer of the potentiometer type, having a more linear or flatter static error band over a greater range of force or pressure than has heretofore been attainable.

Another object of the invention is to provide means in a potentiometric force or pressure transducer whereby the amplification of movement of the sensor may readily be changed whereby sensors having various values in full-range movement may be accommodated, without sacrifice of instrument output range or accuracy, and permitting full range of motion of the electrical transducer components in all cases.

Other objects of the invention will hereinafter be set out in the appended claims, or made evident in the following detailed description of a preferred exemplary transducer embodying the invention, the exemplary instrument being illustrated generally on grossly enlarged and various scales in the accompanying drawings and in which drawings:

As is hereinbefore indicated, force or pressure sensors such as aneroid cells (either single or tandem) may be constructed to conform to specifications that restrict the permissible maximum diameter and length, and may be produced to operate over any reasonable specified range of force or pressure. That is necessary if a single specific size and construction of housing, supporting means and electrical components is to be made to accommodate all ranges of the quantity to be sensed. Obviously, in such an instrument construction, the extent or measure of full-range movement of sensors varies greatly depending upon the maximum force or pressure to be measured, and it also varies with operating range of the instrument. For example, a sensor for a high-pressure instrument has a very small full-range movement, whereas a sensor for a very low-pressure instrument has a relatively large full-range movement. Thus, if full-scale movement of the potentiometer wiper is to be utilized in both types of instruments, as is essential in order to provide for much-desired maximum resolution in electrical output, the amplification of sensor-movement must differ markedly in the two instruments. The present invention permits ready adjustment of the sensor motion-amplification ratio provided by components of identical form and dimensions in instruments of the same physical size, whereby full-scale potentiometer wiper movement may be attained irrespective of the extent of full-range movement of the sensor, and hence irrespective of the range of pressures or forces to be accommodated by the instrument.

Figures 1, 2, 8, 9:
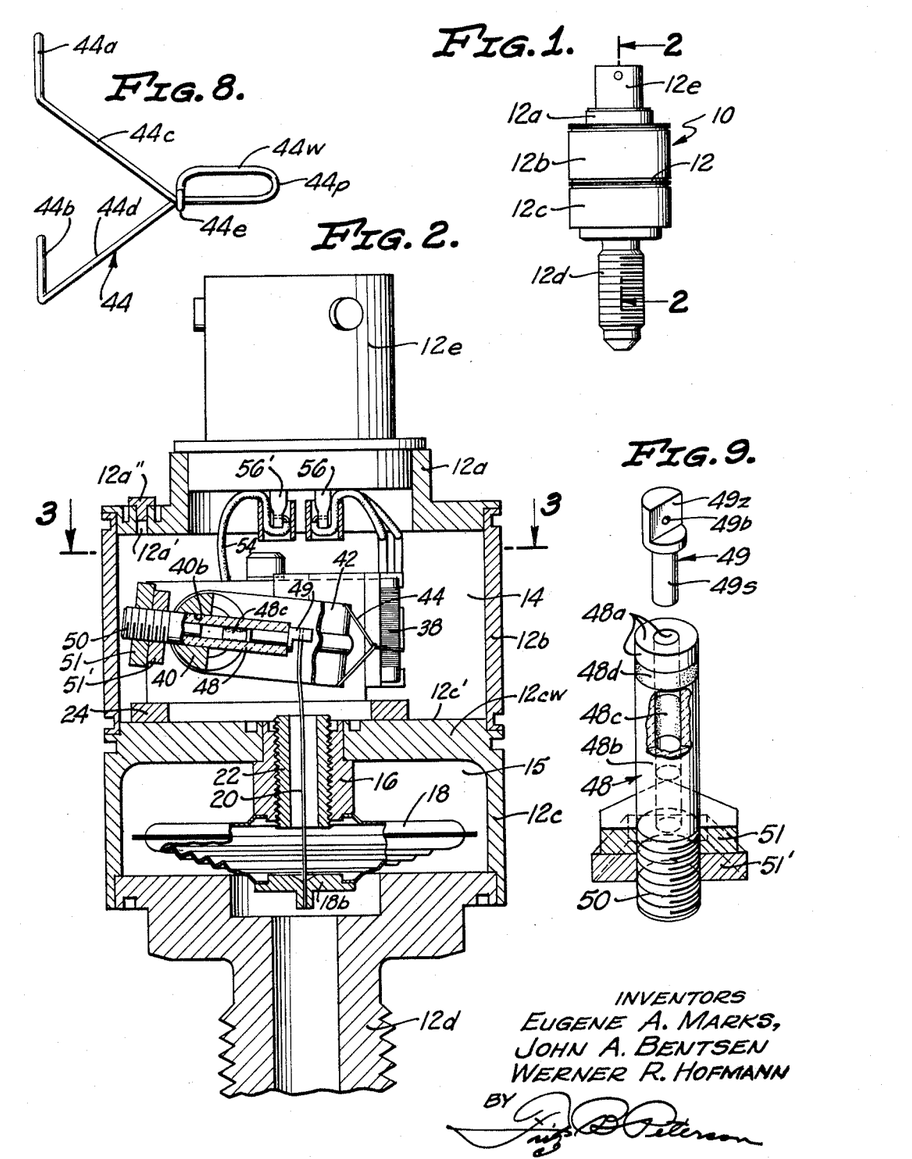
FIGURE 1 is a view showing the general external configuration of the potentiometric pressure transducer forming the herein described exemplary transducer embodying the concepts of the invention.
FIGURE 2 is a considerably magnified longitudinal sectional view on a plane and in a direction as indicated by broken line 2—2 of FIGURE 1, and taken through the axis of a lever comprised in the operative components of the transducer.
FIGURE 8 is a perspective view of a novel potentiometer wiper contact member used in the exemplary transducer.
FIGURE 9 is an exploded pictorial view of a novel lever arm employed in the exemplary transducer.

Referring now to FIGURE 1, the exemplary transducer is denoted by ordinal 10, the transducer including a generally cylindrical body or housing 12 (FIGURE 2) comprising a cap 12a, a shell 12b, a base 12c, and a fitting 12d, all of generally cylindrical configurations. An electrical connector member 12e is sealed in an aperture in cap 12a; and thus when the several housing members are brazed or welded together at the respective mating surfaces the housing provides a sealed interior space into which fluid under pressure may be admitted through the bore of fitting 12d. As is indicated in FIGURE 2, the base 12c is of inverted-cup configuration, dividing the interior of the housing into first and second chambers 14 and 15, respectively. The transverse web 12cw of base 12c is machined to provide a foundation having a flat surface 12c' upon and to which adjustable support means presently to be described are adapted to be secured.

With reference to FIGURE 2, there is firmly sealed (as by brazing) in a centrally located aperture in web 12c' of base 12c, a tubular or cylindrical sensor mount 16 of the character indicated and which mount extends into chamber 15. Sealed and firmly secured (as by welding or brazing) at its fixed side to the end of mount 16 is a sensor which in the chosen exemplary device is an aneroid cell 18. As will become evident or as will hereinafter be made evident, other types of sensors, such as bellows, diaphragms or similar force-summing devices may alternatively be employed in lieu of aneroid cell 18, providing only that the substituted sensor is functionally compatible with other components hereinafter described. The illustrated sensor has secured to a movable portion thereof the lower end of a resilient but stiff transmitter 20 by means of which motions of the sensor incident to changes of applied force or pressure are transmitted to other means presently to be described. As shown, the transmitter 20 is in the form of a stiff resilient wire that at one of its ends is securely sealed in a bore provided in a button 18b forming a movable portion of the elastic aneroid cell 18. As is evident, force applied to the surface of cell 18 by fluid under pressure admitted into or released from chamber 15 through the bore of fitting 12d will permit or cause volumetric change of the cell 18 and result in movement of button 18b. The extent of movement of the button is a measure of the change of force or pressure to which the sensor is subjected. An adjustable stop member 22, in the form of an externally threaded tubular plug that is adjustably positioned and secured in the threaded bore of mount 16, is provided to define one limit of movement of button 18b incident to increasing applied force or pressure. The interior of cell 18 is in open communication with sealed chamber 14, hence expansion (downward) movements of button 18b are limited by the elastic constant of cell 18 and the pressure of the fluid in chamber 14, all as will be understood by those skilled in the art.

Figures 3, 4, 6:
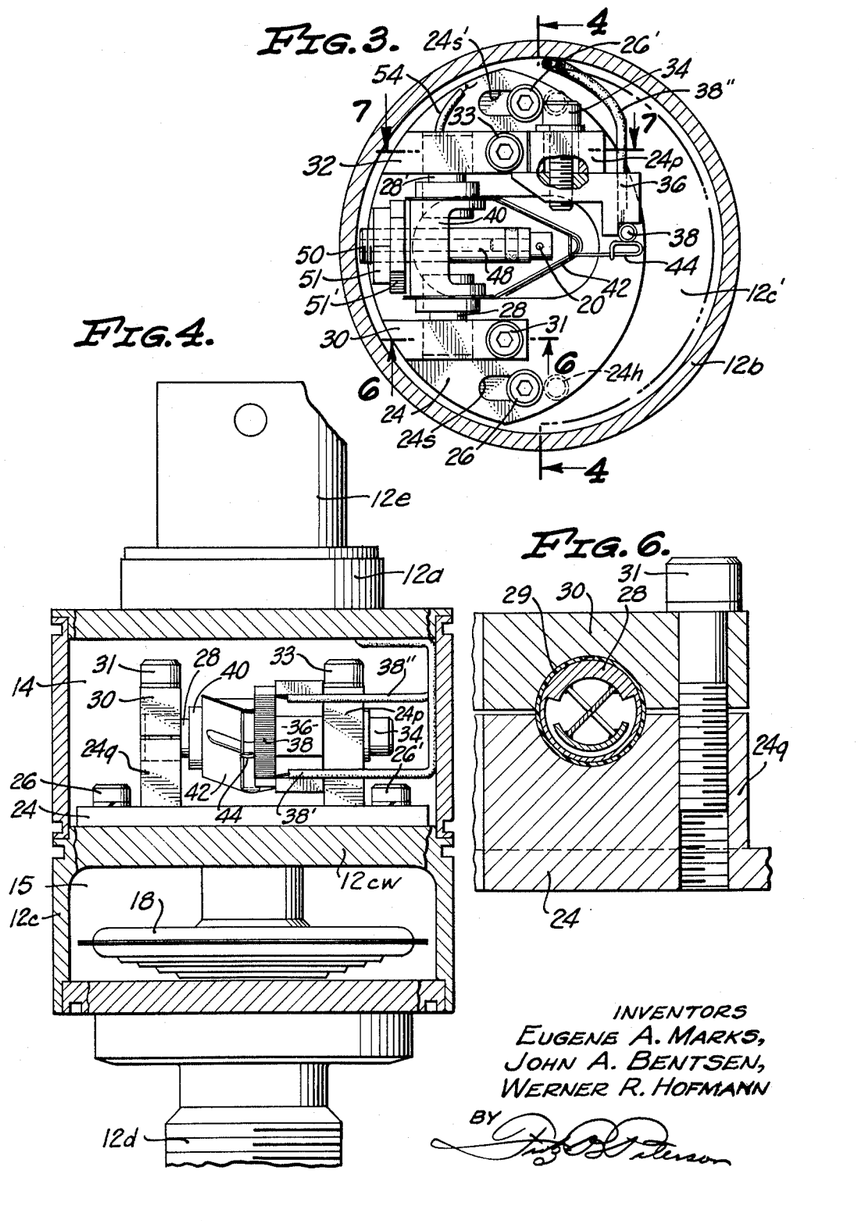
FIGURE 3 is a transverse sectional view on a plane and in a direction as indicated by broken line 3—3 in FIGURE 2.
FIGURE 4 is a view partly in section, depicting housing parts viewed as indicated by broken line 4—4 in FIGURE 3, with other parts of the instrument shown in elevation.
FIGURE 6 is a fragmentary sectional view along a plane and as indicated by broken line 6—6 in FIGURE 3.

With reference to FIGURES 2, 3, and 4, there is secured to the flat surface 12c' of the transverse floor-like web 12cw, means for supporting the principal components of the structure used for converting movements or positional changes of button 18b and transmitter 20 into equivalent electrical output signals representing the respective changes. That supporting means comprises a platform-like support 24 having a base portion of oblate plan form (FIGURES 3 and 3a) constructed and arranged to be adjustably positioned on surface 12c'. The support 24 is provided with elongate mounting holes or slots 24s' for reception of respective ones of cap screws 26, 26' by means of which screws the support is firmly secured to web 12cw of base 12c in any selected one of many possible positions. Web 12cw is preferably provided with four tapped blind holes such as hole 24h (FIGURE 3), for reception of cap screws 26, 26', two only of the tapped holes being used at any time and the other two merely permitting a greater range of transverse adjustment of the position of the support 24 on the base 12c. Thus as is evident from examination of FIGURES 3 and 3a, the support 24 may be positioned with one arcuate side thereof adjacent the inner cylindrical wall surface of shell 12b, or with the opposite arcuate side thereof adjacent an opposing portion of the wall of the shell, or in any of innumerable intermediate positions. This adjustability is of extreme importance, and its purpose will presently be made fully evident.

Figures 3A, 5, 7, 12:
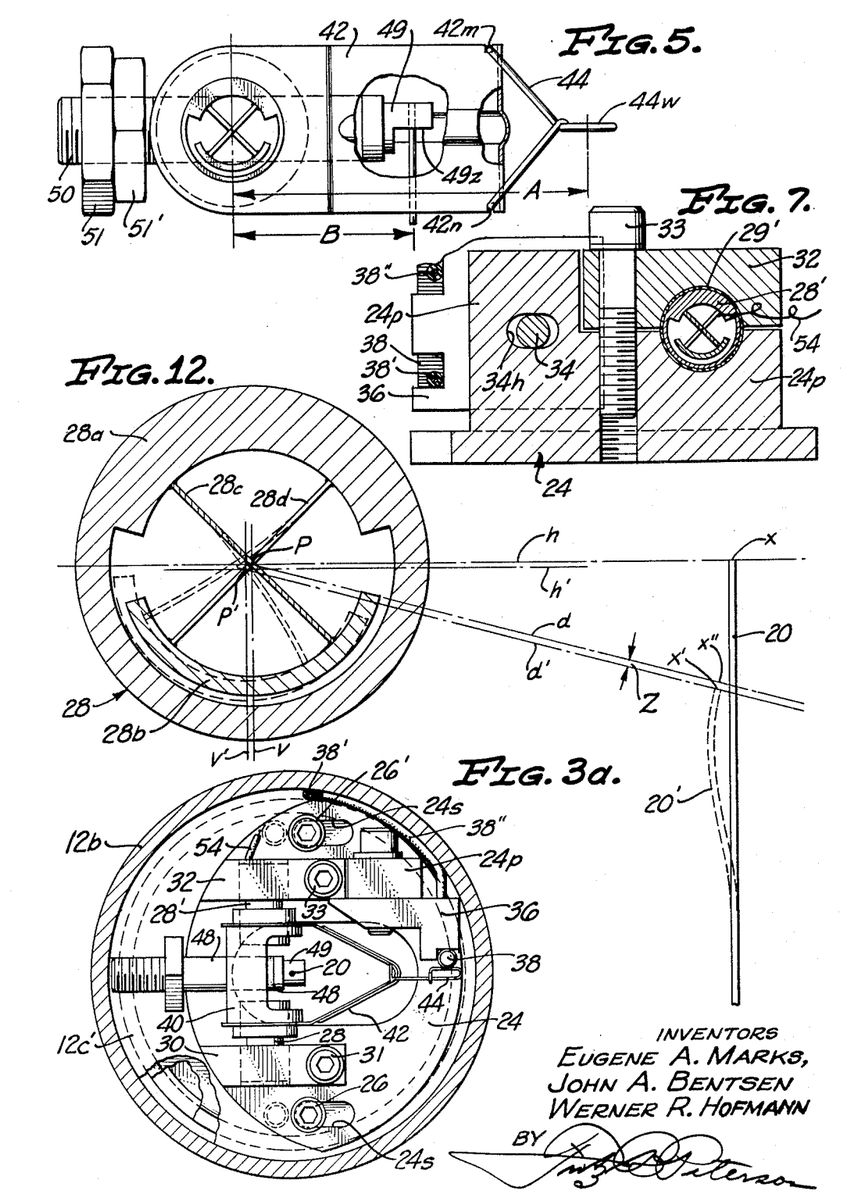
FIGURE 3a is a view similar to FIGURE 3, but showing certain parts in different respective positions.
FIGURE 5 is a fragmentary view in elevation depicting a lever means, lever fulcrum or pivot, potentiometer wiper, movement transmitter, and relationships between those parts, and illustrating features of one pivot device for the lever means of the transducer.
FIGURE 7 is a fragmentary sectional view taken as indicated by broken line 7—7 in FIGURE 3, illustrating the means and mode of providing an improved electrical connection to a potentiometer wiper, and means for adjustably mounting frictionless pivots for a potentiometer wiper lever.
FIGURE 12 is a diagram useful in explaining a novel mechanical feature of the invention.

Support 24 comprises first and second upstanding opposed pedestals 24p and 24q (FIGURES 3 and 4) upon which are supported the lever pivots, clamps and resistance element support of the transducer. As is indicated in FIGURE 6, pedestal 24q is provided with a semicylindrical seat or saddle in which the outboard end of a commercially available cylindrical flexural pivot 28 and associated split insulative sleeve 29 are seated and firmly held in adjusted position by means of a clamp 30 that is brought to bear on the sleeve and pivot by means of a screw 31 as indicated. As is indicated in FIGURE 7, the somewhat longer pedestal 24p is provided with a similar seat or saddle in which a similar insulative sleeve 29' and the outboard end of a similar flexural pivot 28' are secured in adjusted juxtaposition by a similar clamp 32 held in compressive relationship by a screw 33 as indicated. The crossed springs of the flexural pivots 28 and 28' define pivot axes, and the seats and clamps are so formed that the axes are aligned or coaxial. Pedestal 24p, as is indicated in FIGURE 7, is provided with an elliptical transverse hole 34h for reception of a cap screw 34 (see also FIGURES 3 and 4) the threaded end of which screw is turned into a complementary tapped hole provided in an insulative bracket 36 to which a resistance element 38 is attached by suitable means such as adhesive (not shown). As is indicated in FIGURE 3, the position of the resistance element may thus be adjusted toward and away from the axis defined by the flexural pivots 28, 28'. However, it will be noted that the resistance element and the flexural pivots are moved as a unit when the support 24 is adjusted as hereinafter noted. As is made evident in FIGURE 3, the inboard ends of flexural pivots 28 and 28' are secured in respective ones of bores formed in the ends of a pivot housing or yoke, 40. The inboard ends of the flexural pivots are carefully positioned relative to the axis of a lever means presently to be described, and are brazed or welded to the yoke. Thus the yoke is supported for limited movement about the axis provided by the flexural pivots. The yoke has cylindrical end portions of reduced diameter at the inner ends of which portions there is a respective shoulder or annular face against which a respective flat ring-like end of a generally V-shaped wiper carrier 42 is secured in adjusted position as by brazing or welding. The wiper carrier is in the form of a folded deformed sheet (FIGURES 3 and 5), and is provided at its upper and lower edges adjacent the apex thereof with respective sets of notches 42m, 42n, into which respective bent end-portions 44a, 44b (FIGURE 8) of a specially formed wire contact or wiper member 44 are fitted and welded or brazed. The wiper member 44 is preferably formed from a single length of fine wire as indicated in FIGURE 8, and comprises upper and lower struts 44c and 44d that are integral with respective end-portions 44a and 44b, the struts coming together at a juncture 44e at which the lower strut comprises a half-twist or turn about the upper strut. A portion of the wire interconnecting the two struts is formed into a flat loop or hollow "pellet" 44p. The several portions of the wire coming together at the juncture 44e are there welded to form thereat a unitary rigid connection. Thus there is provided an exceptionally rigid but very light-weight resilient wiper presenting a contact area 44w that is disposed to brush along resistance element 38 (FIGURE 3) as a potentiometer contact. The structural arrangement and construction of wiper member 40 is such that it is very light but strong and is exceptionally immune from flutter and other adverse movements incident to the instrument being severely vibrated. Yet the wiper or contact imposes only a very low friction load on the operating mechanism of the transducer.

The flexural pivots, 28 and 28', may for example be of the type marketed by Utica Division of the Bendix Corporation, Utica, New York, and advertised, for example, in a publication No. OOU-6-613A of that manufacturer. In an eminently successful physical embodiment of the exemplary transducer which is illustrated on a grossly enlarged scale in the accompanying drawings, Series 5000 cantilever type flexural pivots of 0.2 inch length and 0.125 inch diameter as marketed by the noted manufacturer are employed. Such pivots are, within prescribed limits of clockwise and ccw rotation substantially frictionless, but are such that the axis does not remain precisely fixed during flexure. As is more fully explained hereinafter, the pivot axis shifts to a small extent during flexure, and advantage is taken of that shifting to correct the slight effect of distortion of the resilient transmitter 20 incident to rocking of the yoke 40.

The preceding description makes it evident that limited substantially frictionless rocking motion of yoke 40 is permitted by the flexural pivots 28 and 28', and that such rocking motion results in traverse of the contact or pellet of wiper 44 along the contact zone of resistance element 38. Rocking motion of yoke 40 in either direction from a selected neutral or zero position or attitude is resisted by the springs comprised in the flexural pivots. Rotative effort is exerted upon the yoke by lever means next to be described.

Yoke 40 is provided at its center with a transverse bore 40b (FIGURE 2) in which is adjustably fixed a lever means comprising a lever arm 48 that preferably is of strong insulation and preferably is of tubular ceramic material. Lever arm 48 bears conductive metallic coatings or films over selected areas thereof whereby other components may be affixed therto by may be electrically insulated from each other. As is indicated in FIGURE 9, lever arm 48 bears at a first end a metallic coating or film 48a that covers the end of the arm and etxends into the interior and along the exterior of the tube. Similarly the second end portion of the lever arm bears a second metallic coating or film 48b that is separated from coating or film 48a by inner and outer annular uncoated areas 48c and 48d, respectively.

Hard soldered to film 48a, as indicated to FIGURE 2, and thus firmly secured to the first end of the lever arm, is a shaped plug 49 (FIGURES 2 and 9) which has a shank portion 49s dimensioned to fit in the metallized end of the bore of the lever arm as indicated in FIGURE 2. Plug 49 has a shaped end formed to provide a flat surface 49z that is positioned to lie in a plane passing through the axis of the flexural pivots. The surface 49z is also formed and positioned to be perpendicular to the axis of transmitter 20 when lever arm 48 is in mid-position with the flexural pivots relaxed. The plug 49 also is provided with a bore 49b (FIGURE 9) dimensioned and positioned to receive the upper end of the transmitter 20 with a snug fit and arranged to be coaxial with the transmitter in mid-position. The upper end of the transmitter is welded to the plug 49 at the upper curved surface of the plug, for a reason presently to be made evident.

At its second end the lever arm has affixed thereto an exteriorly threaded plug 50 (FIGURES 2 and 9), on which plug are secured first and second adjustable counterweights, 51 and 51'. The plug has a portion of reduced diameter dimensioned to fit in the bore of lever arm 48, as indicated of FIGURE 2. The counterweights 51 and 51' (or but one thereof) are employed to dynamically balance the moving parts of the system comprising the sensor, transmitter, lever, yoke, wiper carrier and wiper. They are preferably selected from a set of counterweights or masses, which set includes some masses of light weights (aluminum alloy, etc.), some of medium weights (steel, brass, etc.), and some of heavy weights (tungstein alloy, etc.). Thus the moving system can be balanced irrespective of the type of sensor employed. The counterweights are selected and positioned during testing procedures and are then locked in position by application of a locking means such as a self-curing resin adhesive.

It is evident that with the force or pressure range of the instrument fixed by specification and the sensor cell or diaphragm selected for that range, the described components may be assembled so as to utilize the full electrical length of the resistance element 38. The full-range movement of the movable part (button 18b) of the sensor is known for each type of sensor. Hence the reqired amplification factor of the lever and wiper means may be computed. Referring to FIGURE 5, that factor is the ratio of the distance A between the flexural pivot axis and the contact zone of the resistance element, to the distance B between the flexural pivot axis and the center of bore 49b in plug 49. The amplification of motion by the system meay thus be defined as $A/B$. The former distance, A, is fixed; hence the distance B is adjusted to provide the required amplification. To that end, lever arm 48 is adjusted in the bore 40b of the yoke 40 to provide the required distance B as the driving lever arm, and the lever arm is then secured in the bore by soldering or brazing. Support 24 is then moved laterally across the surface of web 12cw to a position in which bore 49b is aligned with the transmitter 20, and the transmitter is secured to plug 49 as previously noted; and the support 24 is secured in adjusted position by tightening screws 26 and 26'. Resistance element 38 having previously been brought into alignment with loop 44p of the wiper, and into contact with the wiper surface 44w, and bracket 36 having been locked in place by means of screw 34, the several sections of the housing are fusion-united to complete the construction of the instrument.

The preceding description of the structural arrangement makes it evident that the full electrical length or extent of resistance element 38 can be utilized, irrespective of whether the sensor 18 is very stiff and characterized by very short full-range deflection or is very flexible and characterized by a long full-range deflection, the support 24 and the lever means being appropriately adjusted to provide the proper ratio of motion-amplification. Thus high pressure and low pressure ranges, as well as intermediate pressure ranges, can be accommodated with the single instrument configuration and size using components that are all basically the same, with the exception of the sensor. The latter is necessarily chosen to suit the pressures or forces to be measured but any one of the sensors is easily accommodated in the space provided. For example when a very stiff sensor is used, as for sensing large forces or high pressures, only a small full-range movement of transmitter 20 occurs, and in that case support 24 is adjusted to a position to the far right such as is indicated in FIGURE 3a, and lever arm 48 is adjusted in yoke 40 to provide a short driving lever arm and a high motion-amplification factor. Thus in that case the plug 49 is close to the axis of the flexural pivots. On the other hand, when a very flexible sensor of low spring constant is used, as for sensing small forces or low pressures, and the full range of motion of the transmitter is a maximum, the support 24 is positioned to the far left, as indicated in FIGURE 3, with lever arm 48 extended to the right to the limit, thus appropriately increasing the driving lever arm and reducing the motion-amplification factor $A/B$ to a minimum value.

Electrical connections to the respective ends of the resistance element 38 are by way of insulated conductors 38' and 38" (FIGURE 4) which are secured to bracket 36 and/or support 24p, and to the interior wall of shell 12b in any suitable way, as by means of adhesive 39. As is indicated in FIGURE 3, electrical connection to the contact of wiper 44 is by way of the wiper, wiper carrier 42, yoke 40, flexural pivot 28' and insulated conductor 54 one end of which conductor is welded to the fixed ring or a spring of pivot 28' as indicated in FIGURE 7. It may be noted that the flexural pivots and yoke 40 are electrically isolated from the support by means of the insulative sleeves 29 and 29', and from the sensor 18 by the insulative gaps or uncoated bands 48c and 48d of the insulative lever arm 48. Thus the electrically-active elements are insulated from the housing. The insulated conductors 38', 38" and 54 extend to respective sealed lead-through terminals such as 56, 56' (FIGURE 2) provided in connector 12e. Since the several conductors are rigidly secured to fixed structures by adhesive and none of the conductors is movable, all difficulty in connection with breaking of electrical leads due to vibration of free lengths thereof is obviated.

Since the inside of cell 18 is in direct communication with chamber 14, the cell responds to the pressure differential existing between the interior and the exterior of the cell. Thus with chamber 14 open to the ambient, as with a passage 12a' (upper left of FIGURE 2) open, the pressure transducer illustrated would provide signals representing measurements of gage pressure. With cell 18 and chamber 14 evacuated and passage 12a' sealed, as by plug means 12a", signals representing measurements of absolute pressure are provided. Direct application of forces to button 18b, with cell 18 pierced and passage 12a' open, would result in the transducer providing signals representative of magnitudes of the forces applied.

The aforementioned flexural pivot devices 28 and 28' are characterized by the peculiarity that as flexure occurs, that is, as one end rotates while the other end is fixed, the axis of rotation shifts very slightly. That shift is inherent in the physical construction of the devices. According to the present invention, advantage is taken of the shift of the axis of rotation to compensate for a slight "shortening effect" that occurs in the distance between button 18b of sensor 18 and plug 49 of the lever means, due to the slight bending of transmitter 20 when the plug 49 at the end of lever arm 48 is moved in either direction from its midposition. Referring to FIGURE 12, in which a cross-section of one end of a flexural pivot such as 28 is shown, the exterior (outboard) fixed end of the pivot member is denoted by 28a, and the extension of the rotatable other end of the flexural pivot is denoted by 28b. The outboard flexible crossed leaf springs are denoted 28c and 28d, and are shown in their relaxed (intermediate) positions. The leaf springs are welded at their ends to respective ones of parts 28a and 28b. The flexural pivots are so mounted, as shown, that when the lever arm 48 is in midposition, the crossed springs are as depicted, with the pivot axis located along a line perpendicular to the drawing and passing through a point P which is at the line of intersection of planes perpendicular to the plane of the drawing and denoted $h$ and $v$. In that condition plane $h$ includes the axis of lever arm 48. As the lever arm is rotated downwardly by tension in transmitter 20, to a position such as that portrayed in FIGURE 2, its axis is moved to a position in plane $d$ (FIGURE 12). During that movement, part 28b of the flexural pivot is moved to the dotted-line position below and to the left of the original position as depicted in FIGURE 12, with concurrent flexing of springs 28c and 28d to the dotted-line positions shown. During the flexing of the springs, the axis of the inboard cylinder of part 28b of the flexural pivot, and the axis of rotation, shift from position P to position P'.

Since the axis of the lever arm passes at all times through the axis of the yoke, the new position of the axis of the lever arm is in plane $d'$, rather than in plane $d$ as it would have been if the axis of rotation had not shifted from P to P'. Further, since the distance between the point $x$ of the attachment of transmitter 20 to lever arm 48 and the axis of yoke 40 remains constant, the location of that point of attachment will be shifted from $x$ to $x'$ rather than to $x''$ at which it would be if shift of the axis of the yoke had not occurred. During the downward movement of button 18b of the sensor 18, and the resulting downward movement of transmitter 20, the latter is distorted or bent from a straight configuration to one such as that depicted in FIGURE 2 and as indicated in FIGURE 12. Thus in effect there is a net shortening of the distance between button 18b and plug 49 of lever arm 48. That distortion or shortening causes an error in the translation of the rectilinear movement or motion of the button to equivalent rotational movement or motion of the lever arm and yoke. However, that shortening effect has been substantially offset by the shifting of the axis of rotation of the yoke from position P to position P' and the resultant shift of the axis of the lever arm 48 to plane $d'$. The extent to which the point $x$ of attachment of the transmitter 20 to the lever arm has been thus in a sense artificially moved is denoted in FIGURE 12 by Z, which is the distance between points $x'$ and $x''$. By judicious selection of the physical characteristics of transmitter 20, the effective apparent increase of displacement of point $x$ (from $x'$ to $x''$) due to shift of the axis of rotation of the yoke, substantially fully compensates for the decrease in the distance between button 18b and plug 49 caused by the bending of the transmitter. For example, in the exemplary illustrated transducer in which a resistance element of 0.1 inch length is used, the half-sweep angular displacement of the wiper and lever arm 48 (plane $h$ to plane $d'$) is 6.5°, the unrestrained length of transmitter 20 is 0.55 inch, and the transmitter is of round cross-section and stainless steel of modulus of elasticity equal to $30 \times 10^6$. As is considered to be evident, upward movement of lever arm 48 from the mid-position results in a similar deformation of the transmitter 20, and a shift of the pivotal axis to the right of plane V and in plane $h$; providing a similar correction or adjustment.

By the described particular orientation of the flexural pivot members, and by use of the lossless mechanical connections of the stiff resilient transmitter 20 to plug 49 and sensor 18, losses of motion incident to pin or like connections are entirely eliminated and the apparent error incident to bending of the link is substantially fully compensated. Due to the employment of two axially aligned flexural pivot members to support the yoke, all deformation incident to cantilever support of a rotatable member from a single crossed-spring pivot is eliminated; and, in addition, much smaller crossed-spring flexural pivot devices may be used, and adverse effects due to vibration are grossly reduced.

For details of the construction of the flexural pivots 28 and 28' reference may be made to the pertinent literature published by the noted manufacturer. In general, and as herein illustrated, each flexural pivot comprises coaxial inboard and outboard cylindrical portions such as part 28a (FIGURE 12) with respective integral sector-shaped extensions such as part 28b, and crossed leaf springs interconnecting the extensions with the cylindrical portions. In a typical specimen of such pivot member 28, a single centrally disposed wide spring is welded at one end to both the cylindrical portion and the extension of the inboard end, and near each end of the unit a respective single narrow spring is welded at one end to the cylindrical portion of one part and at its other end to the extension of the other part. The line defined by the intersection of planes parallel to the faces of the springs and passing through the centers is the axis of the structure when the pivot is in neutral attitude.

Certain aspects and principles of the invention, and advantages thereof, may be explained with reference to the graphical representations and disclosures contained in FIGURES 10 and 11. In a potentiometric transducer for converting variations in applied force or pressure into corresponding changes of electrical potential, several sources of error in the conversion are inherent. A first is the relative movement of contacting parts, causing friction error. A second is hysteresis effects and error. A third is the resistance element itself, which due to lack of uniformity of the resistive material causes nonlinearity of instrument output; and possibly also imperfect resolution which produces an error. The noted three types of possible error are herein termed (1) friction error, (2) hysteresis error, and (3) linearity and resolution (L-R) error. These errors vary somewhat among instruments of the same size, design and manufacture.

Figure 10:
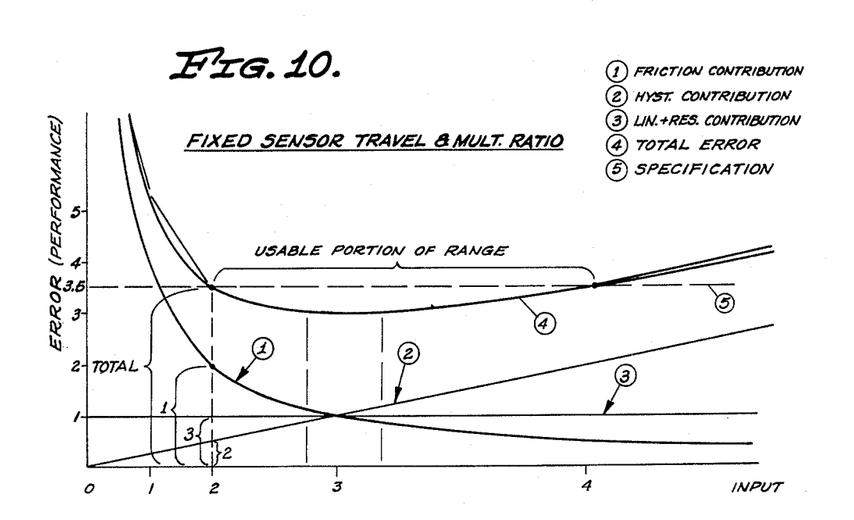
FIGURES 10 and 11 are, respectively, first and second graphical representations useful in explaining certain aspects and concepts of the invention.

Referring to FIGURE 10, the graphs are plotted with input, or sensor force or pressure, in arbitrary units, as abscissae, and performance, in terms of error in arbitrary units, as ordinates. Graph 1 is representative of the contribution of friction effects to the total error over instrument ranges from low to high. Graph 2 is representative of the contribution of hysteresis effects to the total error; and graph 3 is representative of the contribution of deviations of the resistance element from ideal linearity and resolution (L-R). The summation of the several contributions is represented in the total error graph 4. It will be understood that the graphs are representative of the characteristics of a family of particular instruments of graded design configurations which have a prescribed length of resistance element (wiper travel) and a prescribed ratio of sensor-movement multiplication, and, hence, a fixed full-scale sensor movement. Examination shows that the contribution of the friction effects (graph 1) to total error, predominates at the low end of the input range, and decreases rapidly to a relatively insignificant value at the high end of the input range. Conversely, the contribution of the hysteresis (graph 2) is noted to be substantially zero in the low end of the range (at zero input) and to increase practically linearly throughout the operating range of the instrument, to values at which the contribution is much greater than that of the friction effects. The error contribution of L-R effects (graph 3) is substantially constant throughout the entire input range. Since there are inevitable differences from instrument to instrument of the same design and of substantially identical construction, each graph should be considered as being of finite width such as to embrace all such variations.

It is evident from study of the graphs of FIGURE 10 that the usable portion of the total range of an instrument, for a specified maximum error, would be increased if friction effects and hysteresis could be reduced. Also it is evident that the usable portion could be extended, if for low-range instruments the ratio of friction error to hysteresis error could be reduced; and for high-range instruments the ratio of hysteresis error to friction error could be reduced. Both of such apparently desirable changes would contribute to a flatter static error band characteristic. According to the concepts of the invention, friction error is partly and grossly reduced by reducing the active or wiped length of the resistance element to the practical minimum, and/or by providing a very light contact force between the wiper contact and the element, and/or by utilizing flexural pivots rather than pin-pivots for the wiper-driving linkage. By making provisions for selection of any one of a range of different driving lever arm lengths (multiplication ratio) within the same instrument configuration, a sensor of any of a variety of hysteresis factors and full-range movements, but all of the same diameter, may be used; and thus an optimum hysteresis/movement factor may be selected. As previously noted, the length of the resistance element is selected to be the minimum compatible with acceptable resolution that can be made so that wiper travel and friction are minimized. In a commercially accepted version the element is 0.10 inch long, and sensor travel, sensor structure, and multiplication ratio for several ranges are as indicated in the following table:

| Range (p.s.i.) | Mult. ratio | Sensor cells | Sensor travel (in.) |
| --- | --- | --- | --- |
| 0–5 | 1.5 | 2 | .040 |
| 0–10 | 3 | 1 | .040 |
| 0–15 | 3 | 1 | .038 |
| 0–30 | 4.5 | 1 | .025 |
| 0–45 | 6 | 1 | .0185 |
| 0–50 | 6 | 1 | .018 |
| 0–100 | 4.5 | 2 | .011 |
| 0–150 | 6 | 1 | .018 |
| 0–300 | 6 | 2 | .009 |
| 0–500 | 6 | 3 | .006 |

As previously indicated, the structure of the instrument, with exception of the sensor, is the same for all ranges; and the multiplication ratio is adjusted to accommodate the resultant total-range travel of the sensor. By thus permitting use of relatively large sensor movements in low-range instruments, the ratio of friction loss to hysteresis loss is greatly reduced; and by using very small full-range sensor travel or movement for high-range instruments, the ratio of hysteresis to friction loss in high ranges is decreased. Thus the static error band is made much flatter, whereby the usable range is increased in the case of any of the instruments.

Figure 11:
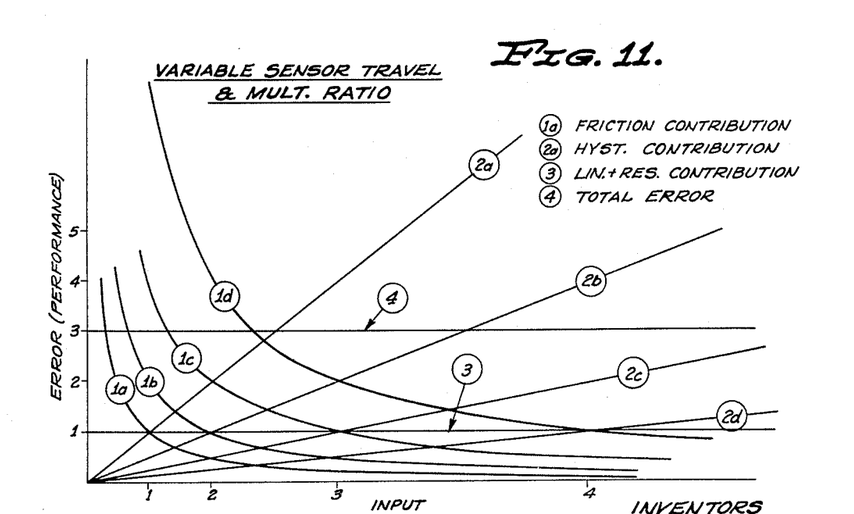

In FIGURE 11, graphs 1a and 2a (and 3) refer to a low-range instrument; and graphs 1d, 2d (and 3) relate to a high-range instrument, both incorporating the concept of the invention. Similarly, graphs 1b, 2b (and 3) relate to a lower middle range instrument and graphs 1c, 2c and 3 to a higher middle range instrument. All four instruments use identical parts, with the exception of the sensors, and the sensors are all the same diameter and fit in chamber 15; thus all four instruments have the same exterior dimensions.

The preceding detailed description makes evident the attainment of the aforementioned objects. In the light of the present disclosure, changes and modifications within the true spirit and scope of the invention will occur to others, and hence it is not desired to limit the scope of the invention to the exact details of the described exemplary structure and mode except as it may be restricted by the appended claims.

We claim:

1. A potentiometric transducer comprising a transducer structure adapted for transforming variations of applied force to corresponding variations of electrical resistance exhibited by potentiometer means, said transducer structure being characterized by a flat static error band of low value and adapted for use with any of a family of force sensors of widely different full-range capacities, said structure comprising, in combination with any one of said sensors:

first means, including means providing a base having a formed supporting surface, and a resilient force sensor supported by said first means and responsive to variation of applied force to distort and thereby incur displacement of a portion thereof relative to said first means along a line of movement, said supporting surface being arranged generally transversely of said line of movement;

second means, including adjustable support means comprising a portion having a surface disposed against and mating with said formed supporting surface of said base and adjustable thereon to any of several positions, and means for securing said support means in adjusted position on said first means, said second means including pivot means supported by said support means and rocking lever means supported by said pivot means for rocking movement in either direction from a mid-position, and said lever means including a lever arm intercepting said line of movement irrespective of disposition of said support means in any of said several positions and said lever means comprising a wiper device arranged to rock concurrently with said lever arm and including a potentiometer wiper contact, said second means including a potentiometer resistance element of predetermined length mounted on said support means and arranged to be wiped by said contact; and third means, including a stiff resilient transmitter member firmly connected at a first end thereof to said lever arm and at a second end thereof to said portion of said sensor at respective points along said line for transmitting movements of said portion of said sensor to said lever means for translation and multiplication thereby, whereby by adjustment of said support means transversely of said line the ratio of multiplication of transmitted motion of said first end of said transmitter member by said lever means is adjustable to accommodate the full range of movement of said one of said sensors to the full range of said wiper contact along the full predetermined length of said resistance element.

2. A transducer according to claim 1, said pivot means comprising first and second coaxially-arranged spaced-apart flexural pivots, and said lever means comprising counterweight means, whereby adverse effects incident to vibration of said transducer structure are substantially obviated.

3. A transducer structure according to claim 1, said pivot means comprising first and second coaxially-arranged spaced-apart flexural pivots, and the connections of said stiff resilient transmitter member to said lever arm and to said portion of said sensor being welded, whereby friction effects in said transducer structure are substantially entirely restricted to those due to wiping of said contact on said resistance element.

4. A transducer structure according to claim 1, said pivot means comprising first and second coaxially arranged spaced-apart flexural pivots each comprising inboard and outboard members interconnected by crossed springs and each characterized by slight transverse shifting of the axis thereof incident to flexure of said springs, said spaced-apart flexural pivots being substantially identically oriented whereby the shifting of the axes of the two flexural pivots is substantially identical to preserve the coaxial relationship of the flexural pivots during flexure.

5. A transducer structure according to claim 4, in which the orientation of said flexural pivots is such that the transverse shift in the coincident axes thereof incident to flexure of said springs is such as to provide compensation of bending error introduced in translation of movement of said second end of said transmitter member, by bending of said transmitter member incident to movement of said lever arm from mid-position.

6. A potentiometer device comprising:

first means, including housing means formed to provide an enclosed chamber;

second means, including sensor means disposed in said chamber and including means for admitting fluid under pressure to the sensor means, said sensor means having a first portion thereof fixed relative to said housing means and a second portion arranged to be displaced realtive to said housing means and along a line of motion, incident to change in the pressure of the admitted fluid;

third means, disposed in said chamber and including support means adjustably mounted on said first means and adjustable transversely of said line of motion;

fourth means, including lever means and means pivotally mounting the lever means on said support means about an axis transverse to and spaced from said line of motion, said lever means comprising a lever arm having an exposed surface intersecting said line of motion, said lever arm being adjustable;

fifth means, including a potentiometer resistance element and a wiper element, one of which elements is secured to the said lever means to move therewith and the other of which elements is affixed to said support means, whereby incident to pivoting of said lever means one of said elements brushes the other, said fifth means comprising terminal connections to the electrical ends of said resistance element and to said wiper element; and sixth means, comprising a stiff resilient slender rod disposed along said line of motion, securely connected at one end thereof to said first portion of said sensor means and at the other end thereof to said exposed surface of said lever means at the intersection of said line of motion and said surface, irrespective of the distance of said intersection from said axis.

7. A potentiometric force transducer comprising;

first means, including force summing sensor means comprising a stationary portion and a portion moved along a line of motion in response to variation of applied force;

second means, including housing means, providing a stationary support for said sensor means and providing a formed surface extending transversely of said line of motion;

third means, including adjustable support means provided with a surface complementary to said formed surface and adjustable transversely of said line of motion;

fourth means supported by said support means, including pivot means providing an axis spaced from said line of motion and pivoted lever means supported thereby for rocking movement about the axis of the pivot means, said fourth means including potentiometer means comprising a resistance element of fixed full-range length spaced from said axis and a potentiometer contact moved along said resistance element by said lever means, said lever means comprising a lever arm having a portion movable about said axis in a plane including said line of motion; and fifth means, comprising transmitter means having end portions disposed substantially in said line of motion and secured to said movable portion of said sensor and to said lever means for translating motion produced by said sensor to said lever means for moving said lever means and said contact, said third means and said fourth means being constructed and arranged for adjustment to vary the motion-multiplication ratio between said sensor and said contact whereby by adjustment of said support means transversely of said line of motion the full-range length of said element is wiped incident to full-range movement of said movable portion of said sensor when said sensor is any of a family of sensors having different full-range movements in said line of motion.

8. A transducer according to claim 7, said pivot means comprising flexural pivot means, and said transmitter means comprises a stiff resilient wire firmly secured at one end to the movable portion of said sensor and at the other end to said lever arm, and said flexural pivot means being so oriented that the shift in the axis thereof incident to flexure thereof compensates at least in part the error in motion translation introduced by bending of said transmitter means during such flexure.

9. A transducer according to claim 7, said pivot means comprising first and second spaced-apart flexural pivots coaxially related and similarly oriented relative to said line of motion, said lever arm comprising a portion having a plane surface intersecting said line of motion at right angles when in mid-position, and said transmitter means comprising a stiff resilient wire firmly secured at one end to said movable portion of said sensor in said line of motion and firmly secured at the other end to said lever arm at said plane and disposed along said line of motion when said lever arm is in mid-position, whereby to restrict frictional effects in said transducer to those produced by wiping of said contact on said element.

10. A potentiometric transducer for accurate translation of changes of an applied force to corresponding changes of electrical resistance with a flat error band over any of ranges of applied force including a low range and a high range, said transducer comprising;

potentiometer means, of fixed full-range dimensions;

selected sensor means, adapted for full-range operation over a particular selected one of a plurality of applied-force ranges including a low range and a high range much higher than the low range, said sensor having a stationary portion and a movable portion the movement of which is proportional to change of force applied to the sensor, said sensor having a full-range movement different from that of sensors for other ranges;

adjustable lever means the adjustment of which adjusts the amplification of motion provided thereby between an input thereto and the output thereof, said lever means being connected to said potentiometer means to operate the latter in response to movement of the lever means;

and transmitter means providing a frictionless connection between said movable part and said lever means to provide an input to the lever means for translation thereby to said potentiometer means, said lever means being adjusted to provide full-range operation of said potentiometer means incident to full-range operation of said sensor, whereby by adjustment of said lever means said potentiometer means can be accommodated to any of a plurality of different sensors having different respective full-range movements and operating over respective different full-range extents of applied force.

11. A potentiometric pressure transducer comprising:

first means, including a resilient pressure sensor having a stationary portion and a movable portion movable through a full range of movement along a line of movement in response to variation of applied pressure through the full range of said transducer;

second means, including base means to which said sensor is secured, said second means providing a formed surface stationary with respect to the stationary portion of said sensor and disposed transversely of said line of movement;

third means, including support means provided with a surface complementary to said formed surface, said support means being adjustable on said formed surface, and means securing said support means in adjusted position on said base means;

fourth means, including potentiometer means, supported on and by said support means, said potentiometer means comprising a resistance element of fixed length and a movable contact arranged to brush along a contact surface of said element from end to end of the element; and fifth means, including adjustable motion-amplifying means supported on said support means and connected to said contact to move the latter along said element to an extent proportional to an input motion of lesser extent;

and means providing a frictionless connection between said movable portion of said sensor and said motion-amplifying means to provide input motion for said motion-amplifying means of extents substantially equal to motions of said movable portion of said sensor means, whereby said support means may be adjusted to provide that degree of amplification of motion to cause said contact to brush the full length of the contact surface of said element incident to full-range movement of said movable portion of said sensor.

12. A potentiometric transducer according to claim 11, said sensor being any one of a plurality of sensors operable over respective different ranges of applied pressure and each characterized by a respective different full-range movement of the respective movable portion.

13. A potentiometric pressure transducer comprising:
first means, including base means presenting a shaped supporting surface, and a resilient pressure sensor secured to said first means and having a free portion movable through a full-range movement along a line of movement generally transverse to said surface in response to variation of applied pressure through the full range of said transducer;
second means, including support means adjustably mounted on said base means on said supporting surface and adjustable thereon transversely of said line of movement, said second means including pivot means on said support means and lever means mounted for rocking movement on said pivot means about the axis of the latter, said lever means comprising a first arm of fixed length and a second arm of adjustable length rocking in a plane including said line of movement and said second arm comprising a point movable in opposite directions from a mid-position on said line of movement incident to rocking of said lever means from a mid-position;
third means, including a potentiometer comprising a resistance element of fixed length affixed to said support means, said potentiometer comprising a contact carried by said first arm of said lever and disposed to brush the full length only of said element incident to full-range rocking movement of said lever means, and terminal connections to said contact and to respective ends of said element; and
fourth means, comprising a stiff resilient wire having a first end portion firmly secured to said free portion of said sensor at a point along said line of movement and a second end portion firmly secured to said second arm of said lever means at said point thereon, said support means being adjusted transversely of said line of movement to a position whereat said contact brushes the full length of said element incident to full-range movement of the free portion of said sensor, whereby said base means and said second, third and fourth means can be used in conjunction with pressure sensors characterized by different full-range movements of the free portions thereof to selectively provide a transducer having a full-range capacity selected from among a plurality of widely different full-range capacities.

14. A potentiometric transducer as defined in claim 13, in which said pivot means comprise first and second coaxially disposed but spaced-apart generally cylindrical flexural pivots characterized by a slight shifting of the axes thereof incident to flexure, said pivots being oriented to maintain coaxial relationship during concurrent rotational flexure, said stiff resilient means bending during such flexure of said flexural pivots and thereby causing reduction of the distance separating said points of attachment of the resilient means to said sensor and said lever arm, and the orientation of said flexural pivots effecting shift of the axes thereof in a direction to compensate for said reduction.

15. A potentiometric transducer as defined in claim 13, said first lever arm and said contact comprising as an integral member a resilient wire forming divergent limbs connected at a juncture thereof with an open loop of wire, the wire being welded at said juncture, and a rigid first lever arm portion having spaced-apart areas to which ends of said divergent limbs are welded, whereby said contact has excellent immunity from free vibration when the transducer is subjected to vibration.

16. In a potentiometric transducer:
first means, including a sensor for sensing variations of a variable physical quantity, said sensor having a portion moved along a line of motion incident to variation of the physical quantity sensed;
second means, including base means and support means mounted on said base means and adjustable thereon transversely of said line of motion, and lever means including a lever arm having a full-range movement and having a point thereon rotatable in a plane including said line of motion, said second means comprising flexural pivot means adjustably mounted on said support means and supporting for limited rotation about an axis said lever means;
third means, comprising a resilient member firmly connected to said portion of the sensor and extending to and connected firmly to said lever arm at said point, said support means being adjusted so said point is on said line of motion when said lever arm is in mid-position in said range of movement, and said flexural pivot means being so adjusted that shifting of the axis thereof incident to flexure of the pivot means compensates for bending of said resilient member from said line of motion; and
fourth means, including potentiometer means connected to and operated by said lever means,
whereby the linear motion of said portion of sensor is accurately and substantially without friction translated to arcuate movement of said potentiometer means of greater extent.

17. A potentiometric transducer comprising:
first means including sensor means and rotatable lever means connected to and operated by the sensor means, said lever means comprising a wiper arm providing spaced-apart pairs of points of attachment; and
second means, including a potentiometer resistance-element and terminal connections to the resistance element; and
potentiometer contact means, including a wire bent to form a small complete closed loop portion providing a contact surface in wiping contact with said element, said wire comprising struts extending divergently away from said loop in a plane transverse to the plane of the loop, each of said struts comprising a respective end portion bent and disposed transverse to the plane of the struts and each end portion having rigid connections to a respective pair of said points of attachment to said wiper arm,
whereby said contact means is readily adjusted toward said element to adjust the contact pressure thereon but is relatively rigid in directions transverse thereto while being extremely light in weight.

18. A potentiometric transducer according to claim 17, in which the plane of said divergent struts of said contact means is substantially at right angles to the axis of rotation of the lever means.

19. A potentiometric transducer according to claim 17, in which said wire is twisted to form said loop, and is united at the twist thereof by means selected from among solder and brazing compound.

20. A potentiometric transducer comprising:
first means, including sensor means having a portion movable along a line of movement in response to variations in the physical quantity being sensed, and a motion transmitter secured to said portion;
second means, including support means firmly connected to said first means, said second means including flexural pivot means supported by said support means, and means insulating said flexural pivot means from said support means, said second means comprising a potentiometer resistance element and terminal means for said resistance element;
third means, including lever means supported for limited rotation by said flexural pivot means, said lever means comprising a conductive wiper arm conductively connected to said flexural pivot means and bearing a wiper contact in brushing engagement with said resistance element, said lever means being connected to said transmitter to be rotated thereby, said first means and said third means comprising means electrically insulating said flexural pivot means from said sensor means, and a terminal connection electrically connected to said flexural pivot means, whereby a terminal connection to said wiper contact is provided without use of a loose wire connection.

21. The method of producing a group of dimensionally alike potentiometric pressure transducers characterized by flat static error band characteristics and capability of functioning selectively over any one of a plurality of widely differing ranges of applied pressure, said method comprising:

providing for the transducers identical potentiometers and respective movement-translating and amplifying lever systems therefor each composed of parts identical to like parts of the other lever systems and adjustable to provide respectively different movement amplification ratios for full-range operation of different potentiometers;

providing a plurality of pressure-sensitive capsules each characterized by a respective high or low hysteresis characteristic and a respective full-range movement of expansion and contraction;

selecting for each low pressure-range transducer a respective capsule characterized by a relatively large full-range expansion movement and a relatively large hysteresis characteristic and selecting for each high pressure-range instrument a respective capsule having a relatively small full-range expansion movement and a relatively low hysteresis characteristic;

adjusting the lever arm lengths for the low-pressure transducers to provide a low ratio of movement multiplication to provide full-range operation of the potentiometers for full-range expansion of the low-pressure capsules;

adjusting the lever arm lengths for the high-pressure transducers to provide a high ratio of movement multiplication to provide full-range sweep of the wipers for full-range motion of the high-pressure capsules; and in each transducer connecting the capsule to the lever arm for translation of the movement of expansion of the capsule to rotary motion of the lever arm;

whereby by selection of an appropriate capsule and appropriate adjustment of the lever arm, otherwise identical pressure transducers are produced which have flat static error band characteristics and are capable of functioning over respective ones of widely differing ranges of applied pressure.

References Cited by the Examiner
UNITED STATES PATENTS

| | | | |
|---|---|---|---|
| 2,350,607 | 6/44 | Gonsett et al. | 338—170 |
| 2,886,679 | 5/59 | Jonke | 338—41 |
| 2,931,994 | 4/60 | Gibbs | 338—41 |

RICHARD M. WOOD, *Primary Examiner.*

UNITED STATES PATENT OFFICE
CERTIFICATE OF CORRECTION

Patent No. 3,173,120　　　　　　　　　　　　　　March 9, 1965

Eugene A. Marks et al.

It is hereby certified that error appears in the above numbered patent requiring correction and that the said Letters Patent should read as corrected below.

Column 3, line 14, for "necessiate" read -- necessitate --; column 6, line 74, for "slots 24s✓" read -- slots 24s, 24s✓--; column 8, line 48, for "by" read -- but --; column 8, line 51, for "etxends" read -- extends --; column 9, line 30, for "meay" read -- may --; column 14, line 66, for "realtive" read -- relative --.

Signed and sealed this 20th day of July 1965.

(SEAL)
Attest:

ERNEST W. SWIDER　　　　　　　　　　　　　　EDWARD J. BRENNER
Attesting Officer　　　　　　　　　　　　　　Commissioner of Patents